United States Patent [19]
Jung

[11] Patent Number: 5,561,475
[45] Date of Patent: Oct. 1, 1996

[54] VARIABLE BLOCK MATCHING MOTION ESTIMATION APPARATUS

[75] Inventor: Hae-Mook Jung, Seoul, Rep. of Korea

[73] Assignee: Daewoo Electronics Co., Ltd., Seoul, Rep. of Korea

[21] Appl. No.: 367,522

[22] Filed: Dec. 30, 1994

[51] Int. Cl.⁶ ................................................. H04N 7/28
[52] U.S. Cl. ........................................ 348/699; 348/413
[58] Field of Search ................................. 348/699, 700, 348/402, 409, 413, 416

[56] References Cited

U.S. PATENT DOCUMENTS 5,036,393  7/1991  Samad et al. ............................ 348/699

FOREIGN PATENT DOCUMENTS 5328334  12/1993  Japan .

OTHER PUBLICATIONS

Jin Tae Kim et al., "A variable size block matching algorithm using local characteristics of images", Journal Of The Korean Institute Of Telematics And Electronics, vol. 29b, No. 7, pp. 540–547, Jul. 1992.

Nasrabadi et al., "Interframe hierarchical vector quantization", Optical Engineering, vol. 28, No. 7, pp. 717–725, Jul. 1989.

P. Strobach, "Tree-structured scene adaptive coder", IEEE Transactions On Communications, vol. 38, No. 4, pp. 477–486, Apr. 1990.

*Primary Examiner*—Tommy P. Chin
*Assistant Examiner*—A. Au
*Attorney, Agent, or Firm*—Anderson Kill Olick & Oshinsky, P.C.

[57] ABSTRACT

An apparatus for detecting motion vectors between a current frame and a previous frame of video signals based on a block matching motion estimation approach comprises a variable block formation section for defining a variable search block from the current frame, the variable search block is extended from a selected search block which is a plain picture block without having an edge of an object within the current frame; and a motion-estimation section for estimating the variable search block with respect to each of candidate blocks included in the previous frame to provide a number motion vector and an error function corresponding thereto, the motion vector representing the displacement of pixels between the search block and a candidate block which yield a minimum error function.

1 Claim, 3 Drawing Sheets

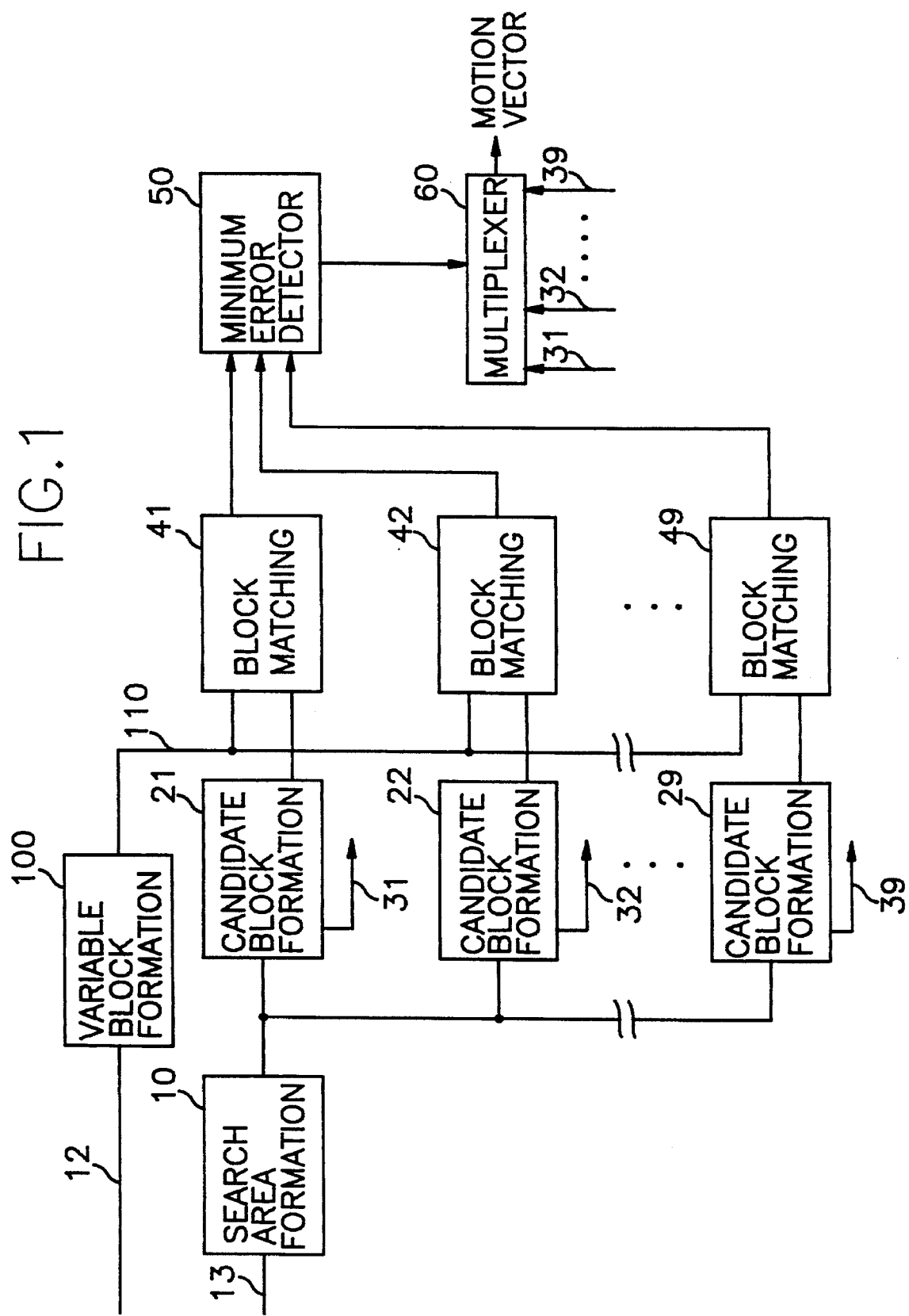

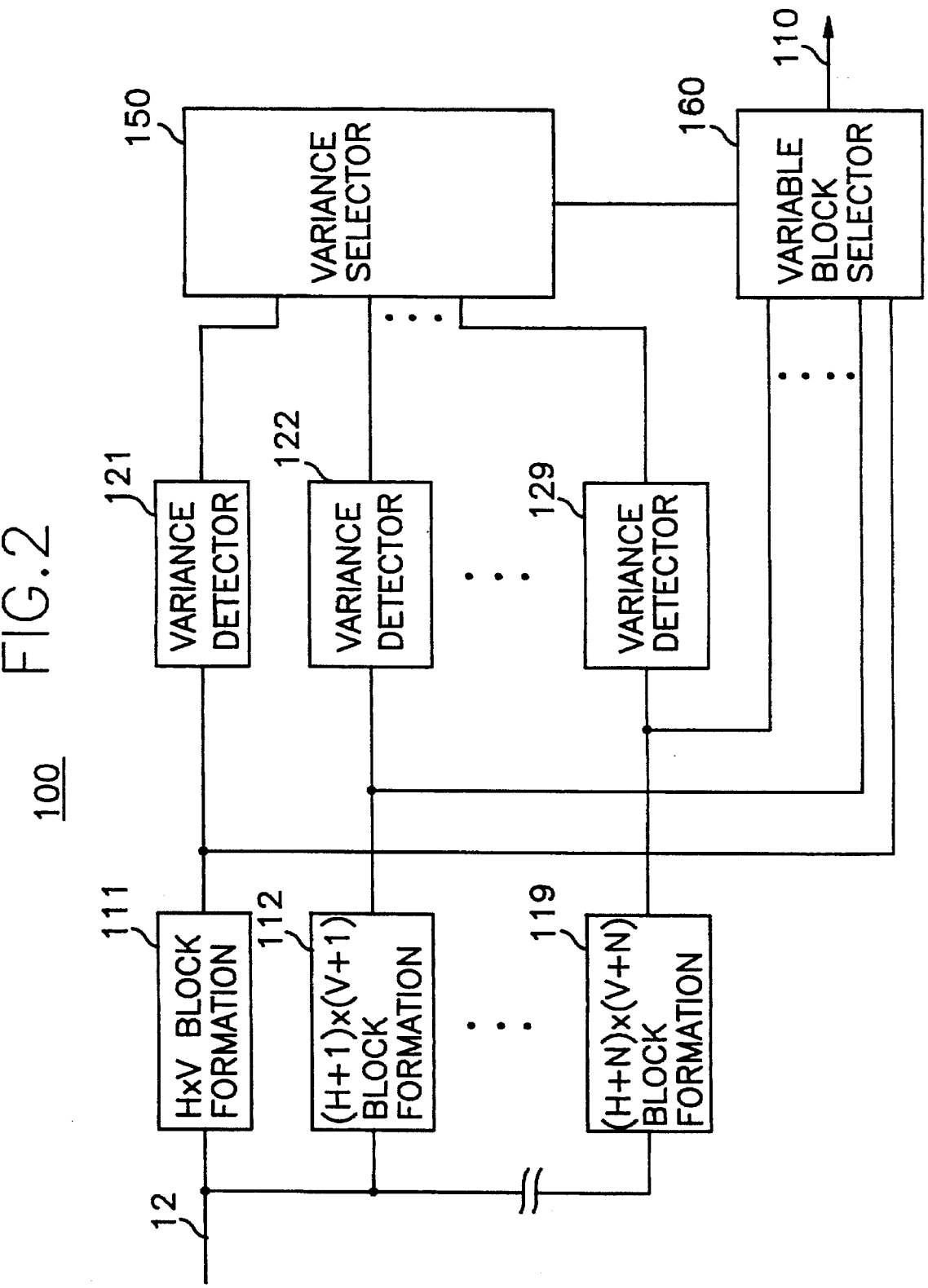

VARIABLE BLOCK MATCHING MOTION ESTIMATION APPARATUS

FIELD OF THE INVENTION

The present invention relates to a motion estimation apparatus for use in an image signal encoding system; and, more particularly, to a motion estimation apparatus for detecting a motion vector of a variable block based on a block matching algorithm.

DESCRIPTION OF THE PRIOR ART

When an image signal comprising a sequence of image "frames" is expressed in a digital form, substantial amounts of data are generated for transmission, especially in the case of a high definition television system. Since, however, the available frequency bandwidth of a conventional transmission channel is limited, in order to transmit the substantial amounts of digital data through the limited channel bandwidth, it is inevitable to compress or reduce the volume of the transmission data. Among various video compression techniques, a motion compensated interframe coding technique, which utilizes temporal redundancies of the video signals between two adjacent video frames for the compression of the signals, is known to be one of the effective compression techniques.

In the motion compensated interframe coding scheme, current frame data is predicted from a previous frame data based on an estimation of the motion between the current and the previous frames. Such estimated motion may be described in terms of two dimensional motion vectors representing the displacement of pixels between the previous and the current frames.

One of the motion vector estimation schemes which have been proposed in the art is the block matching algorithm. According to the block matching algorithm, a current frame is divided into a plurality of equal-sized search blocks. The size of a search block typically ranges between 8×8 and 32×32 pixels. To determine a displacement for a given search block from the current frame, a similarity calculation is performed between the search block of the current frame and each of a multiplicity of equal-sized candidate blocks included in a generally larger search region within a previous frame. In carrying out the similarity measurement, there are many error function such as a MSE (mean square error) or a MAE (mean absolute error) which may be employed.

And a motion vector, by definition, represents the displacement between the search block and a candidate block which yields a minimum error function. The motion vector is then used in a receiver to reconstruct a picture from the previous frame on a block-by-block basis.

In such a block-by-block basis motion estimation, it would be desirable or convenient to employ an equal-sized search block. Sometimes, there may be a plain picture pattern without having any edges of an object in the current frame over several adjacent blocks or with a slight edge therein. In the former case, however, the block matching motion estimation may yield motion vectors different from one another for each block; and, in the letter case, it may produce a motion vector identical to that of the plain picture pattern with no edge.

SUMMARY OF THE INVENTION

It is, therefore, a primary object of the invention to provide an improved motion estimation apparatus capable of precisely detecting a motion vector through the use of a variable block.

In accordance with the invention, there is provided an apparatus for detecting motion vectors between a current frame and a previous frame of video signals employing a block matching motion estimation approach, wherein the current frame is divided into a number of search blocks of an identical size and the preceding frame is divided into a corresponding number of search regions, each search region having a plurality of candidate blocks of said identical size, which comprises: a variable block formation section for defining a variable search block from the current frame, said variable search block being extended from a selected search block which is a plain picture block without having an edge of an object within the current frame; and a motion-estimation section for estimating the variable search block with respect to each of the candidate blocks to provide a motion vector and an error function corresponding thereto, said motion vector representing the displacement of pixels between the search block and a candidate block which yields a minimum error function.

BRIEF DESCRIPTION OF THE DRAWINGS

The above and other objects and features of the present invention will become apparent from the following description of preferred embodiments given in conjunction with the accompanying drawings, in which:

FIG. 1 shows a schematic block diagram of a variable block motion vector measurement apparatus for use in a motion estimation system in accordance with the invention;

FIG. 2 illustrates a detailed block diagram of the variable block formation section shown in FIG. 1.

DETAILED DESCRIPTION OF THE PREFERRED EMBODIMENTS

Figures 3A, 3B:
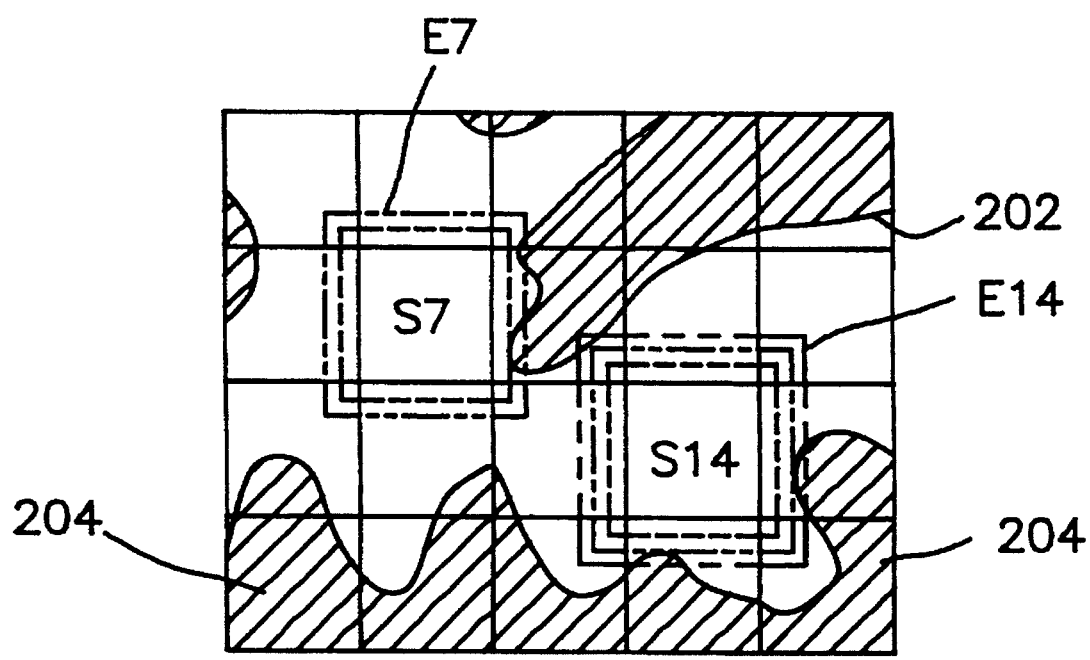
FIGS. 3A and 3B represents an exemplanary diagram explaining a variable block expanded on a pixel basis.

Referring to FIG. 1, there is shown a preferred embodiment of a variable block motion vector measurement apparatus incorporated in a motion estimation scheme which is used to achieve a significant data compression by utilizing redundancies between successive frames, i.e., a current frame and its adjacent or previous frame. That is to say, there may be differences between the current frame and the previous frame, which are induced by a displacement or motion of an object; however, such differences may be confined to a relatively small region within a frame. Therefore, it is not necessary to transmit the entire image data of a current frame to a receiver (not shown). Instead, it may suffice to transmit the displacement information, i.e., motion vectors. The receiver then reconstructs the current frame from its previous frame whose image data is stored in a frame memory within the receiver, utilizing the motion vectors.

The current frame signal is provided through a line 12 to a variable block formation section 100. The variance detection section 100 serves to divide the current frame into a number of search blocks of an identical size which will be used to carry out a block matching in a sequence. In FIG. 3, the current frame, depicted generally as a reference numeral 200, is illustrated to have, e.g., twenty (20) divided search blocks S1 to S20, each comprising H×V pixels. For the sake of illustration, it is assumed that H and V are both an equal number 16 for each search block of pixels in the current frame 200. Further, the variable block formation section 100 sequentially selects a search block which represents a plain picture block without having an edge of an object within the current frame and expands the selected search block per one pixel basis until the boundary of the search block includes an edge. As can be seen from FIG. 3B, when search blocks, e.g., S7 and S14 are selected in sequence, the search block S7 and S14 are extended to the boundaries E7 and E14 which include an edge portion of objects 202 and 204, respectively.

Each of the expanded blocks of pixels is provided to a number of block matching sections 41 to 49 in sequence. In accordance with the invention, inclusion of an edge can be detected by calculating a variance for the expanded block, which will be further described with reference to FIG. 2 hereinbelow.

FIG. 2 shows a detailed block diagram of the variable block formation section 100. In order to select a search block representing the plain picture, the variable block formation section 100 goes through a series of block formation stages, only three 111, 112 and 119 of which are exemplarily shown therein, which divide the current frame on a line 12 into a number of search blocks as shown in FIG. 3A. At each of the block formation stages 111, 112 and 119, a search block is increasingly expanded in one pixel step from 1 to n in its horizontal and vertical directions. More specifically, a first block formation stage 111 generates search blocks in an H×V pixel pattern; a second block formation stage 112 expands the search blocks in the (H+1)×(V+1) pixel pattern; and a last block formation stage 119 generates the search blocks in the (H+n)×(V+n) pixel pattern. The search blocks generated and expanded by the block formation stages 111 to 119 are fed to a variable block selector 160 and a series of variance detectors 121 to 129 which calculate the variances for those search blocks to detect the presence of an edge therein, respectively. Each of the variances calculated by the variance detectors 121 to 129 may be defined as follows:

$$\text{var}(i,j) = \frac{1}{EH \times EV} \sum_{i=1}^{EH} \sum_{j=1}^{EV} (I(i,j) - \text{mean})^2$$

wherein var(i,j) represents the variance of a pixel at a coordinate (i,j) in a search block; EH×EV is the size of an expanded block; I(i,j) is a luminance level at a pixel coordinate (i,j) in the expanded block; and mean represents the mean luminance level for pixels in the expanded block.

The mean luminance level is defined as follows:

$$\text{mean} = \frac{1}{EH \times EV} \sum_{i=1}^{EH} \sum_{j=1}^{EV} I(i,j)$$

All of the calculated variances are applied to a variance selector 150. The variance selector 150 compares the variances with a predetermined threshold. In accordance with the invention, the predetermined threshold is chosen to have a value greater than and closest to the variance of the search block representing the plain picture. Accordingly, the variance selector 150 selects a variance satisfying the threshold and produces a selection signal indicative of the selected variance to the variable block selector 160. The variable block selector 160, which is of a conventional multiplexer, in response to the selection signal, chooses the search block which corresponds to the selected variance. The search block from the variable block selector 160 is then provided to the block matching sections 41 to 49 as shown in FIG. 1.

Referring back to FIG. 1, meanwhile, the previous frame stored in a memory (not shown) is fed to a search area formation section 10 through a line 13. The search area formation section 10 defines a generally large search region of the previous frame with an equal size, shape and search pattern, whereby the search or comparison will be carried out.

After the search region is determined at the search area formation section 10, the search region data is also applied to a corresponding number of candidate block formation sections, only three 21, 22 and 29 of which are illustratively shown in FIG. 1. At each candidate block formation section, a candidate block of pixels is generated from the search region as the search block sweeps through the search region starting at the upper left-most position moving horizontally one pixel position at a time, and then vertically down through the search region moving one scan line at a time, until finally reaching the lower right-most position within the search region. All the possible candidate blocks with the size of H×V pixels are formed within the determined search region. And then, the relative displacement corresponding to each candidate block from the location of the search block provided from the variable formation section 100 is derived and then provided to a multiplexer 60 through lines 31 to 39 as a motion vector of that candidate block.

The pixel data of each candidate block is also provided from each of the candidate block formation sections 21 to 29 to each of the block matching sections 41 to 49. At each of the block matching sections 41 to 49, an error function is calculated between the search block from the variable block formation section 100 and the candidate block from each of the candidate block formation sections 21 to 29. Conventionally, comparison of the luminance level or light intensity is performed between corresponding pixels in the search block and the candidate block to yield the error function for that candidate block. The error function indicates the degree of similarity between the search block and the selected candidate block.

All the error functions from the block matching sections 41 to 49 are supplied to a minimum error detector 50. The minimum error detector 50 compares the error functions to select an error function which has a smallest error.

The minimum error detector 50 outputs a selection signal which indicates the block corresponding to the minimum error function to the motion vector selector 60. The motion vector selector 60, which is of a conventional multiplexer, in response to the selection signal, chooses the displacement vector of the candidate block, which corresponds to the minimum error function. As described above, if a candidate block has the minimum error function, that candidate block will be most similar to the search block; consequently, the displacement vector of the candidate block will be chosen as the motion vector.

In this connection, the motion compensation to be performed in a transmitter and a receiver will be achieved with respect to the search block instead of the expanded block which is utilized for the main purpose of precisely detecting a motion displacement between a search block and a candidate block.

Further, although it is not shown or described, as is evident in the art, it should be noted that information on the range of an expanded block is provided to the candidate block formation sections.

While the present invention has been shown and described with reference to the particular embodiments, it will be apparent to those skilled in the art that many changes and modifications may be made without departing from the spirit and scope of the invention as defined in the appended claims.

What is claimed is:

1. An apparatus for detecting motion vectors between a current frame and a previous frame of video signals employing a block matching motion estimation approach, wherein the current frame is divided into a number of search blocks of an identical size and the previous frame is divided into a corresponding number of search regions, each search region having a plurality of candidate blocks of said identical size, which comprises:

means for sequentially selecting a search block which is a plain picture block without having an edge of an object within the current frame;

means for expanding the selected search block per one pixel basis in a horizontal and a vertical directions until the boundary of the search block includes an edge, to thereby produce expanded search blocks;

means for deriving variances for the expanded blocks to detect the presence of an edge therein;

means for comparing each of the variances with a predetermined threshold to select a variance smaller than the predetermined threshold, wherein the predetermined threshold is chosen to have a value larger than and closest to the variance of the selected search block; and means for selecting an extended search block corresponding to the selected variance; and means for motion-estimating the expanded search block with respect to each of the candidate blocks to provide a motion vector and an error function corresponding thereto, said motion vector representing the displacement of pixels between the search block and a candidate block which yields a minimum error.

* * * * *